(12) United States Patent
Rahman et al.

(10) Patent No.: US 6,292,328 B1
(45) Date of Patent: Sep. 18, 2001

(54) BOTH ENDS OPEN FLUID DYNAMIC BEARING HAVING A JOURNAL IN COMBINATION WITH A CONICAL BEARING

(75) Inventors: Mohamed Mizanur Rahman, San Jose; Gunter Karl Heine, Aptos; Hans Leuthold, Santa Cruz; Raquib Uddin Khan, Pleasanton, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/536,265

(22) Filed: Mar. 27, 2000

Related U.S. Application Data

(63) Continuation of application No. 08/981,548, filed as application No. PCT/US97/23640 on Dec. 19, 1997, now Pat. No. 6,130,802.
(60) Provisional application No. 60/044,100, filed on Apr. 23, 1997.

(51) Int. Cl.[7] .................................................. G11B 17/02
(52) U.S. Cl. .............................................. 360/99.08
(58) Field of Search ........................... 360/98.07, 99.08, 360/99.04; 384/110, 107, 112, 114, 123; 310/90

(56) References Cited

U.S. PATENT DOCUMENTS

| 5,246,294 | 9/1993 | Pan ....................................... 384/119 |
| 5,448,120 | 9/1995 | Schaule et al. ......................... 310/90 |
| 5,770,906 | * 6/1998 | Hazelton et al. ....................... 310/90 |

* cited by examiner

Primary Examiner—Robert S. Tupper
(74) Attorney, Agent, or Firm—Thomason, Moser & Patterson, LLP

(57) ABSTRACT

A method of creating an improved hydrodynamic fluid bearing is provided which is relatively insensitive to shock vibration changes in load and rotational speed. The hydrodynamic bearing motor in which the bearing is open at both the upper and lower ends, and in which the balance of fluid flow within the bearings is maintained. The assembly of the hydrodynamic bearing is more easily assembled, and the gaps are easily adjusted. In the design of the hydrodynamic bearing, the tolerances for assembly of the various components is minimized; that is, the critical nature of many of the gaps is diminished.

4 Claims, 6 Drawing Sheets

Both Ends Open

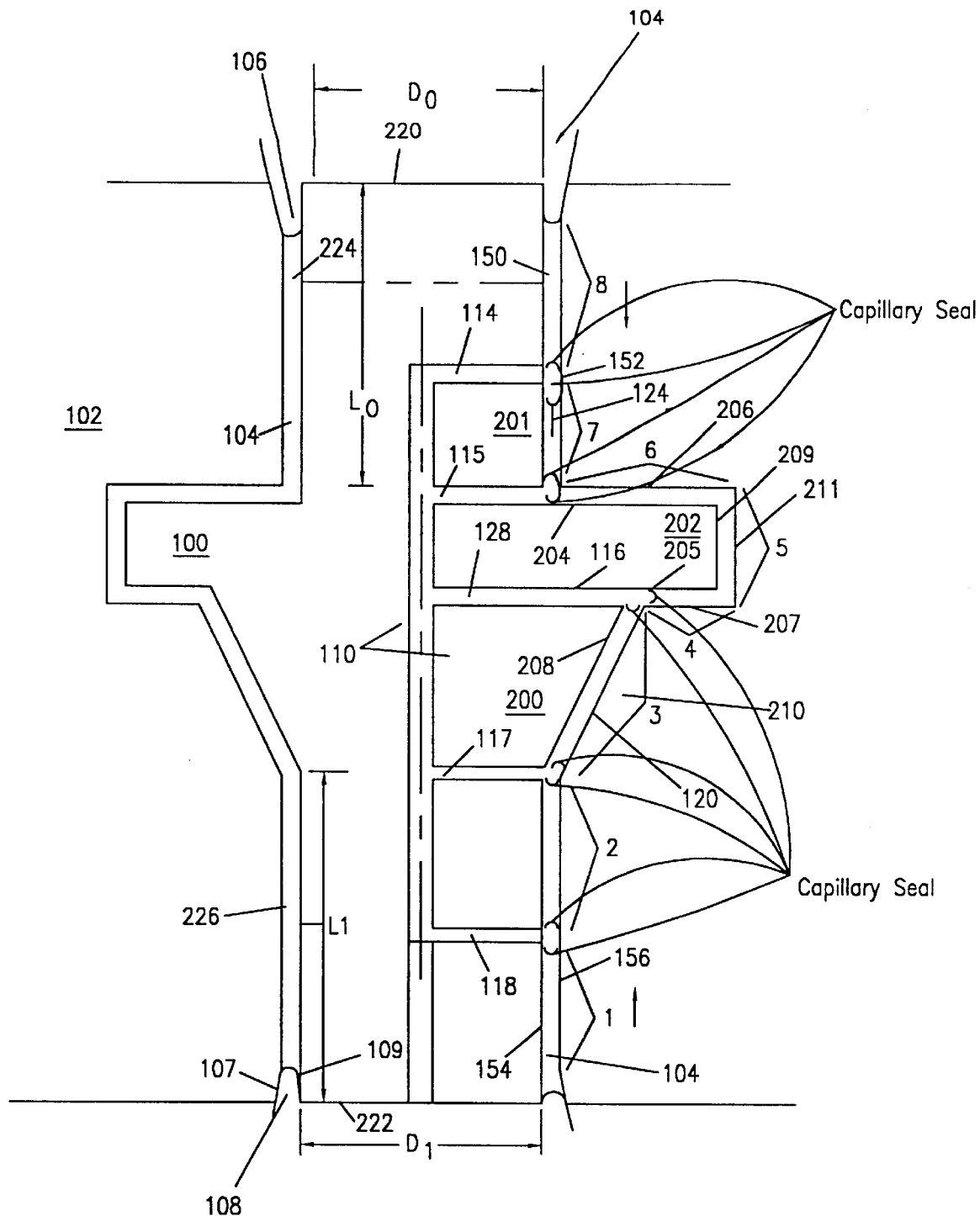
Both Ends Open  FIG. 3

BOTH ENDS OPEN FLUID DYNAMIC BEARING HAVING A JOURNAL IN COMBINATION WITH A CONICAL BEARING

CROSS REFERENCE TO RELATED APPLICATIONS

This application is a continuation application of U.S. application Ser. No. 08/981,548 filed Dec. 19, 1997, now U.S. Pat. No. 6,130,802 issued on Oct. 10, 2000 the priority of which is claimed.

Reference should also be made to U.S. patent application, Ser. No. 08/994,100, filed Dec. 19, 1997; U.S. patent application Ser. No. 09/043,065, filed Dec. 19, 1997; and U.S. patent application Ser. No. 08/981,338, filed Dec. 19, 1997; all of which are assigned to the assignee of this invention and are incorporated herein by reference which is a 371 of PCT/US97/23640 filed Dec. 19, 1997 and claims benefit of provisional application 60/044,100 filed Apr. 23, 1997.

FIELD OF THE INVENTION

The present invention relates to magnetic disc drive storage systems, and more specifically, the present invention relates to a hydrodynamic fluid bearing for use in a magnetic disc drive storage system.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly dose to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair races which allow a hub of a storage disc to rotate relative to a fixed member. However, ball bearing assemblies have many mechanical problems such as wear, run-out and manufacturing difficulties. Moreover, resistance to operating shock and vibration is poor because of low damping. Thus, there has been a search for alternative bearing assemblies for use with high density magnetic storage discs.

One alternative bearing design which has been investigated is a hydrodynamic bearing. In a hydrodynamic bearing a lubricating fluid such as air or liquid provides a bearing surface between a fixed member of the housing and a rotating member of the disc hub. In addition to air, typical lubricants include oil or ferromagnetic fluids. Hydrodynamic bearings spread the bearing interface over a large surface area in comparison with a ball bearing assembly which comprises a series of point interfaces. This is desirable because the increased bearing surface reduces wobble or run-out between the rotating and fixed members. Further, the use of fluid in the interface area imparts damping effects to the bearing which helps to reduce non-repeat runout.

However, hydrodynamic bearings themselves suffer from a number of disadvantages based on how they are designed. For example, a single plate cantilevered bearing has a low stiffness-to-power ratio and could be sensitive to external vibration, imbalances and shock.

A desirable solution to this problem would be to have the spindle motor attached to both the base and the top cover of the disc drive housing. This would increase overall drive performance. A motor attached at both ends is significantly stiffer than one held by only one end.

All of the known hydrodynamic motor designs provide no method for top cover attachment. The reason for this is that in order to have top cover attachment, the motor and specifically the bearing would need to be open on both ends. Opening a motor at both ends greatly increases the risk of oil leakage out of the hydrodynamic bearing. This leakage is caused by, among other things, small differences in net flow rate created by differing pumping pressures in the bearing. If all of the flows within the bearing are not carefully balanced, a net pressure rise toward one or both ends may force fluid out through the capillary seal. Moreover, due to manufacturing imperfections of the bearing, the gap in the journal may not be uniform along its length and this can create pressure imbalance in the bearing—and hence, cause leakage when both ends of the hydrodynamic bearing are open. The net flow due to pressure gradients in a bearing has to be balanced (by all the journals individually) for the fluid to stay inside the bearing. Any imbalances due to pumping by the grooves of the journals will force the fluid out of the capillary until the meniscus at one end moves to a new equilibrium position. This dynamic equilibrium position of the meniscus will depend among other things on the speed (N), journal radius (R), journal gap (H), and on the amount of taper that comes from tolerance on cylindricity.

To minimize the effects of pressure imbalances, the bearings need to be decoupled from each other as much as possible. One of the ways to do so is to vent the bearings to the atmosphere at their ends. One of the reasons for this kind of venting in the bearing is that the effect of any kind of pressure imbalances or flow imbalances can be localized. If the bearing is not adequately vented in this way, there are chances that it will leak from the bearing. Thus, a need exists for a new approach to the design of a hydrodynamic bearing based motor to optimize stiffness (both radial and axial) and damping, and hence its dynamic performances. It is also desirable to design a hydrodynamic bearing which is open at both ends and which does not leak and which functions properly.

SUMMARY OF THE INVENTION

Thus, it is an object of the present invention to create an improved hydrodynamic fluid bearing which is relatively insensitive to shock, vibration, changes in load and rotational speed. Yet another objective of the present invention is to provide a hydrodynamic bearing motor in which the bearing is open at both the upper and lower ends.

A related objective of the invention is to provide a hydrodynamic bearing open at both ends in which the balance of fluid flow within the bearings is maintained.

Yet another object of the present invention is to provide a hydrodynamic bearing assembly which is more easily assembled, and in which the gaps are easily adjusted.

A further objective of the invention is to provide a hydrodynamic bearing design in which the tolerances for assembly of the various components is minimized; that is, the critical nature of many of the gaps is diminished.

Another objective of the invention is to provide a hydrodynamic bearing useful in a spindle motor or the lice which is stiffer than known standard spindle motors which are supported only at one end.

A further objective of the invention is to design a hydrodynamic bearing useful in a spindle motor or the like in which the motor could be attached to both the top cover and the base of the housing for the spindle motor.

These and other objectives of the invention are achieved by a hydrodynamic fluid bearing useful in a bearing cartridge which cartridge may be incorporated into a spindle motor or the like, where the bearing includes a shaft, a conical bearing supported on the shaft, and journal bearings located at least on one side and typically both above and below the conical bearing. A sleeve is mounted for rotation relative to the shaft and defines, in cooperation with the shaft, the gaps necessary for both the conical hydrodynamic bearing and the axial journal bearings. At the ends of the shaft, capillary seals are defined between the sleeve and the shaft so that fluid does not escape from the hydrodynamic bearing. The shaft itself includes a central vent hole, with bores communicating with both the conical bearing and the journal bearings, this decouples the bearings from each other and any pressure imbalances are localized.

In a further desirable feature, the diameter of one end of the shaft can be made greater than the diameter of the other end of the shaft. This allows for making the gaps between the shaft and the surrounding sleeve or journal to be greater where the diameter of the fixed shaft is greater, reducing the need for tight tolerances within at least part of the hydrodynamic bearing. Preferably the top end of the shaft (i.e. the end of the shaft distant from the base when used in a disc drive spindle motor) has the journal bearing with greater diameter.

Further, incorporating the conical bearing allows for the support of both axial and radial loads. This is especially useful in designs such as spindle motors for disc drives, where a number of discs may need to be supported for rotation, modifying the axial and radial loads which are to be imposed on a given motor.

Yet another advantage of this design is that by providing for attachment of the shaft both at the top and at the bottom, the shaft is more rigid, and stiffer than that of a single plate hydrodynamic bearing. This enhances the resistance to operating shock and vibration of the bearing.

Yet another feature of this invention is that the assembly of the finished bearing and its surrounding sleeve can be more easily achieved by virtue of the fact that only a single conical bearing with axial journal bearings both above and below the conical bearing are provided.

A further feature is that the wider side of a conical bearing can act as a thrust plate carrying load when the bearing is placed vertically. Because of thrust plate and conical bearing, the bearing can be preloaded conveniently by adjusting the gaps.

Other features and advantages of the present invention will become apparent to a person of skill in the art who studies the present invention disclosure given with respect to the following figures.

BRIEF DESCRIPTION OF THE DRAWINGS

FIG. 3 is a vertical sectional view of a hydrodynamic bearing cartridge in accordance with the present invention incorporated in a spindle motor.

DETAILED DESCRIPTION OF A PREFERRED EMBODIMENT

Figure 1:
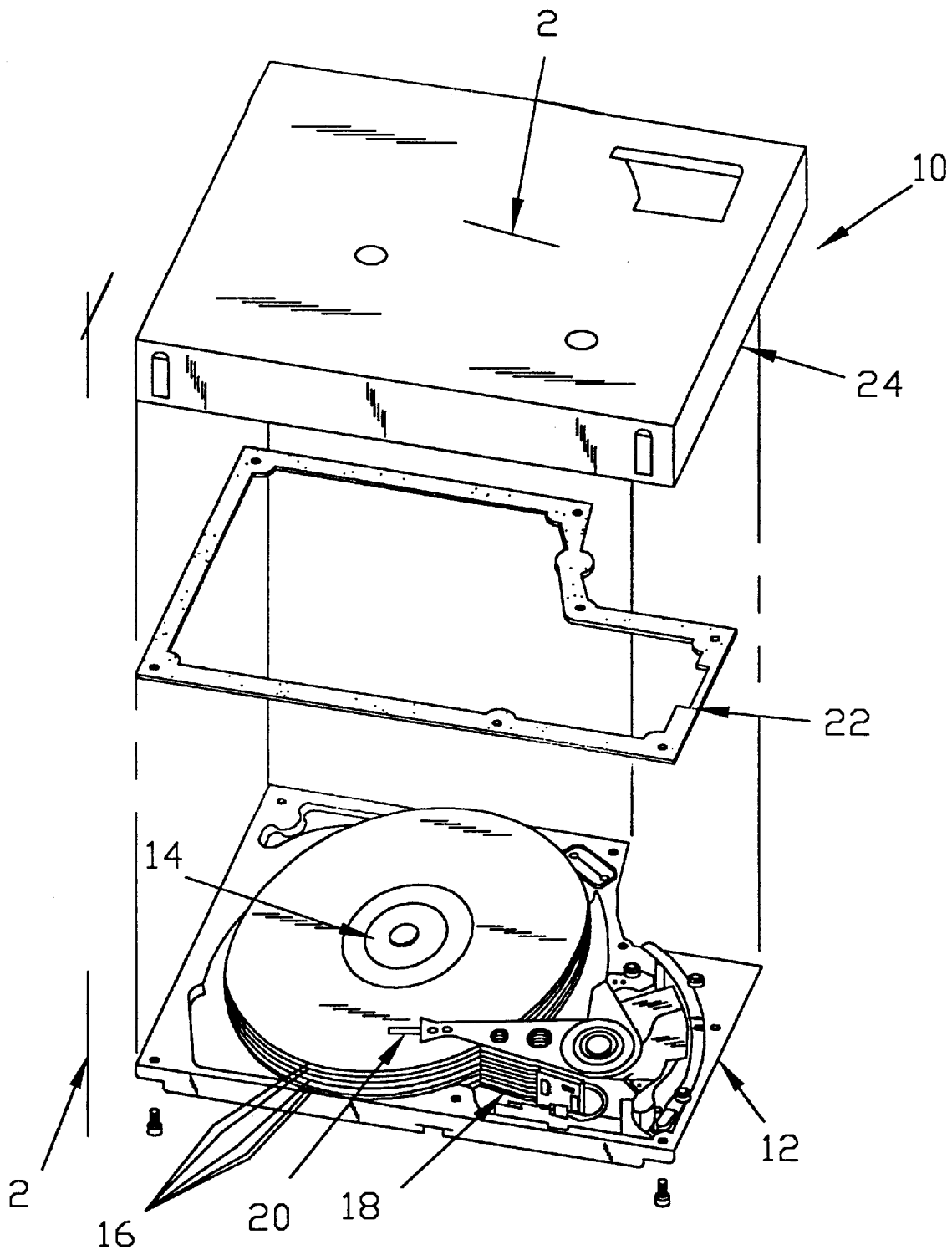
FIG. 1 is a perspective view of a magnetic disc storage system which may incorporate the hydrodynamic bearing cartridge and spindle motor in accordance with the present invention.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this bearing cartridge is not limited to use with this particular design of a disc drive, which is shown only for purposes of the example. Given the many advantages which this invention achieves, it could also potentially be used to support the actuator for rotation. The bearing cartridge also has numerous other uses outside of the field of disc drives.

Further, the fluid bearing disclosed herein has a fixed shaft and rotating, surrounding sleeve. The design is also useful where the sleeve is fixed and the shaft rotates. Since the fluid bearing is open at both ends, the shaft could extend beyond the sleeve and be axially coupled to an external device or system.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain the transducer flying over the surface of the disc. In present day technology, the spacing distance between the transducer and the rotating disc surface is measured in microns; thus it is absolutely essential that the disc does not tilt or wobble.

Figure 2:
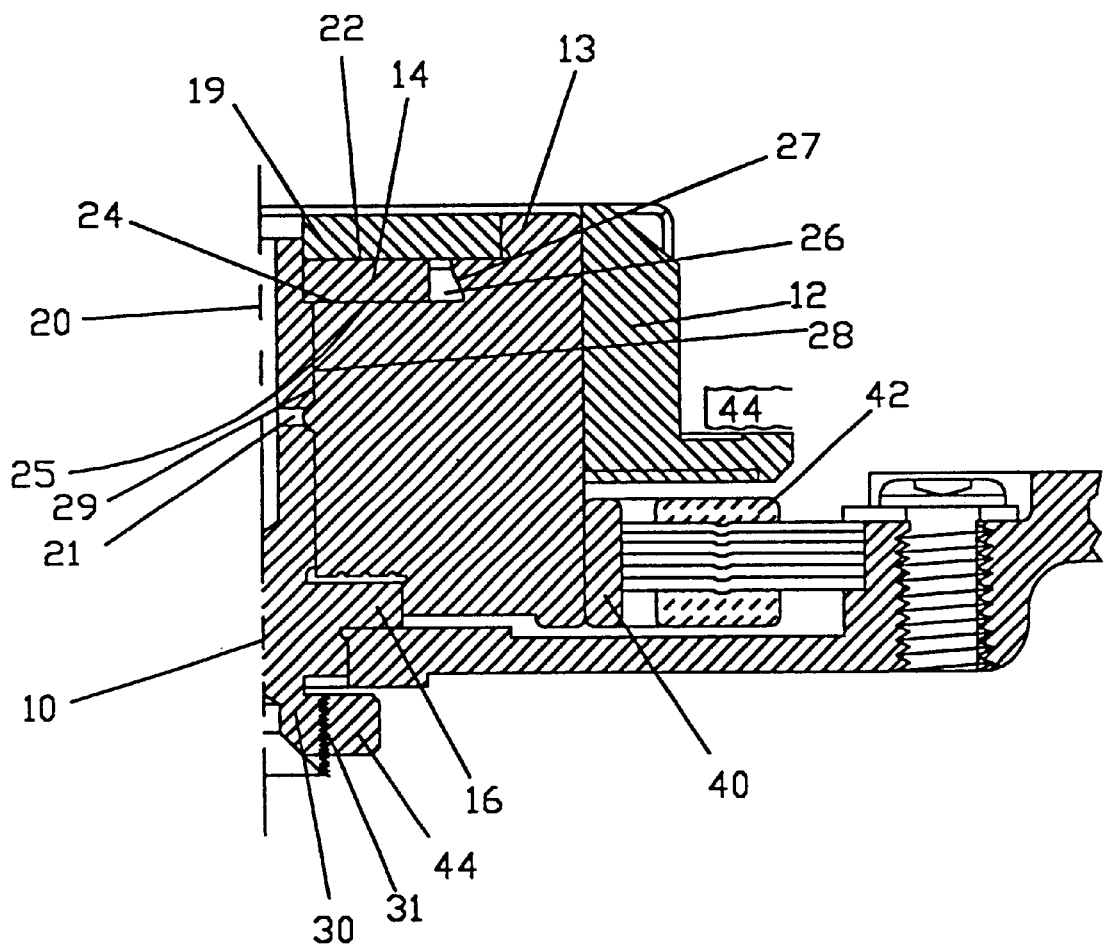
FIG. 2 is a vertical sectional view of a prior art hydrodynamic bearing cartridge incorporated in a spindle motor assembly.

FIG. 2 is a vertical sectional view of a single thrust plate hydrodynamic bearing motor design of a type which is already established in this technology. The basic structure of the motor shown in this figure includes a stationary shaft 10 and a hub 12 supported from a sleeve 13 for rotation around the shaft. The shaft 10 includes a thrust plate 14 at one end, and terminates in a shoulder 16 at the opposite end. The sleeve 13 supports a counterplate 19 at one end, for rotation over the thrust plate 14. The counterplate 19 and thrust plate 14 are separated by a sufficient gap 22 to allow circulation of lubricating fluid to lubricate the hydrodynamic bearing out of the reservoir 20, through the gap 22, through the reservoir 26 defined between the end of the thrust plate 14 and an interior surface 27 of the sleeve 13, and between the lower surface 24 of the thrust plate 14 and an upper surface 25 of the sleeve 13, and between an inner surface 28 of the sleeve and the exterior surface 29 of the fixed shaft. The fluid returns to the reservoir primarily through a central bore 21. In order to promote the flow of fluid over the bearing surfaces which are defined between the thrust plate 14 and the counterplate 19; between the thrust plate 14 and the sleeve 13, and between the shaft 10 and the sleeve 13, typically one of the two opposing surfaces of each such assembly carries sections of grooves as is well known in this technology.

The fluid is supplied to all of the lubricated surfaces from the reservoir 20 to flow over the bearing surfaces and be returned to the reservoir through the bore 21. The remainder of the structure of significance which is used to complete the motor design include shaft extension 30 which ends in threaded region 31 which is threaded into a portion of the base 44. A stator 42 cooperates with magnets 40 which are supported from the sleeve 13, with energization of the stator windings 42 causing rotation of the sleeve 13 and the hub 12 about the stationary shaft.

As used in a disc drive motor, this system supports one or more discs 44 for rotation. Because the transducers and disc drives fly at extremely low heights over the surface of the disc, it is essential that there not be wobble or vibration of the hub and disc as it rotates. Moreover, it is also important that should such wobble occur, that there is no touch down between the surfaces of the thrust plate 14 and the opposing surface of the counterplate 19 and sleeve 13. However, as explained above, in a cantilever type bearing such as shown in FIG. 2, where the load carrying surface which is thrust plate 14 is located far from the center point about which any pivoting would occur in the event of vibration or wobble, there is a much greater chance of a touch down or contact between the facing surfaces, which would result in both wear of the surfaces over the long term with possible sludge formation and increase in power consumption and reduction in bearing life, and a slow down of the rotational speed of the disc in the short term.

It is for this reason that the design of the following figures has been adopted. By adopting this design, load carrying surfaces, whether thrust or conical bearing type, are located closer to the middle of the overall hydrodynamic bearing system. The pivot point about which any rocking of the bearing may occur also lies close to the middle of the bearing. Because of this, by moving the load carrying surfaces as close as possible to the center of the disc, any wobbling or vibration of the disc would have less chance to cause touchdown at the ends of the bearing.

Figures 4A, 4B:
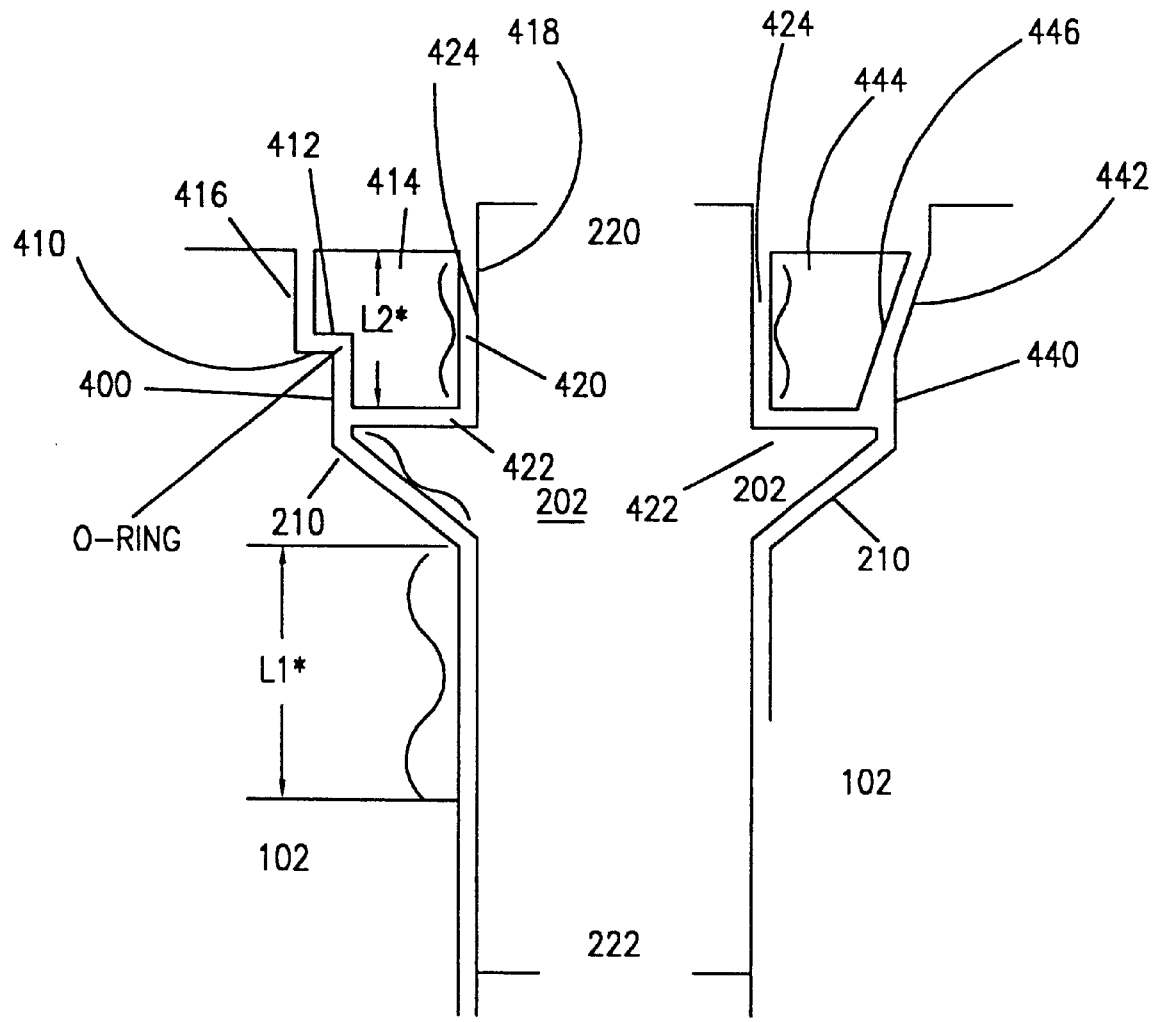
FIGS. 4A and 4B are vertical sectional views of a spindle motor incorporating the present invention including special features useful in assembly of the motor.

Thus, the present invention to be described with respect to FIGS. 3, 4A and 4B, provides the improvement of allowing both the top and bottom ends of a hydrodynamic bearing to be open to the atmosphere. Thus, in a fixed shaft motor which incorporates the present invention, both upper and lower ends of the shaft could be fastened to the base and top cover of the housing, so that the stiffness of the motor and its resistance to shock and vibration as well as its alignment to the rest of the system is enhanced and maintained. Of course, it should be noted that the design, with shaft 100 open at both ends, is any design where relative rotation of both sleeve 102 and shaft 100 is equally possible.

Referring now to FIGS. 3, 4A and 4B, the design of the shaft to be used in the present invention and its relationship to the surrounding rotating sleeve will be shown. It will be immediately apparent to a person of skill in the field who studies this disclosure and looks at the figures how this shaft shown in this figure could be incorporated into the cartridge shown in FIG. 2, previously described, replacing the shaft shown therein.

FIG. 3 is a cross-sectional view of a design for a hydrodynamic fluid bearing comprising a shaft 100 having a sleeve 102 which surrounds the shaft 100, the shaft and sleeve rotating relative to one another. A hydrodynamic fluid is found in the gap 104 between the inner walls of sleeve 102 and the outer walls of shaft 100. The fluid separates the rotating and fixed portions of the bearing and provides a bearing surface therebetween. In order to prevent any fluid from leaving the gap 104, capillary seals 106, 108 are formed at the top and bottom of the gap. This is done by utilizing diverging walls; as shown, the wall 107 of the sleeve diverge from the facing wall 109, although the opposite could be utilized. A similar design could be used at the opposite end of gap 104 to form seal 106. In fact, any of a number of capillary seal designs could be used without departing from the spirit of the invention.

The grooves in the gap, which may be formed either on the exterior surface of the shaft or the interior surface of the rotating sleeve, will be considered in eight different sections, which have been numbered here 1–8. Generally speaking, the top and bottom gap section 7, 8 and 1, 2 comprise journal bearings defined by parallel axial walls 150, 152 and 154, 156 of the shaft 100 and sleeve 102 respectively.

A thrust bearing (sections 4, 6) 202, defined by radial walls 204, 205 of the shaft and counter plate walls 206, 207 of the sleeve 102, is incorporated adjacent one journal bearing sections 7, 8. A conical bearing (section 3), 200 is defined by acute angle walls 208, 210 adjacent the other journal bearing sections 1, 2.

The grooves along bearing sections 1–8 may be either herringbone, sinusoids, half-sins, or other forms as are needed to generate fluid pressure and maintenance of the fluid over the surfaces of the gap. The grooves on the sections 1, 2, 3, 4, 6, 7, 8 are typically balanced, that is, they are defined so that they do not establish a net fluid flow in either direction. As noted above, it has been found that it may not in most cases be necessary to use grooves at all on the short axial section 5 of the bore 104, especially when it is used primarily as a reservoir.

The orientation of the hydrodynamic fluid bearing system of FIG. 3 is important because it determines which elements carry the load. For example, in the FIG. 3 as drawn, the thrust plate 6 is the primary load-bearing surface. The remaining sections especially help to maintain the balance and overall stiffness and damping of the system.

In summary, the combination of the conical bearing generally indicated at 200 and the thrust bearing generally indicated at 202, the thrust bearing 202 being established by the groove pattern 6 and the gap defined by the radial surface 204 of the shaft and the facing complementary radial surface 206 of the sleeve, taken together with the conical bearing 200 being defined by the shaft surface 208 and the complementary sleeve surface 210 provides both the necessary stiffness and rigidity to support a number of discs for rotation without tilt or wobble in the system.

Figure 5:
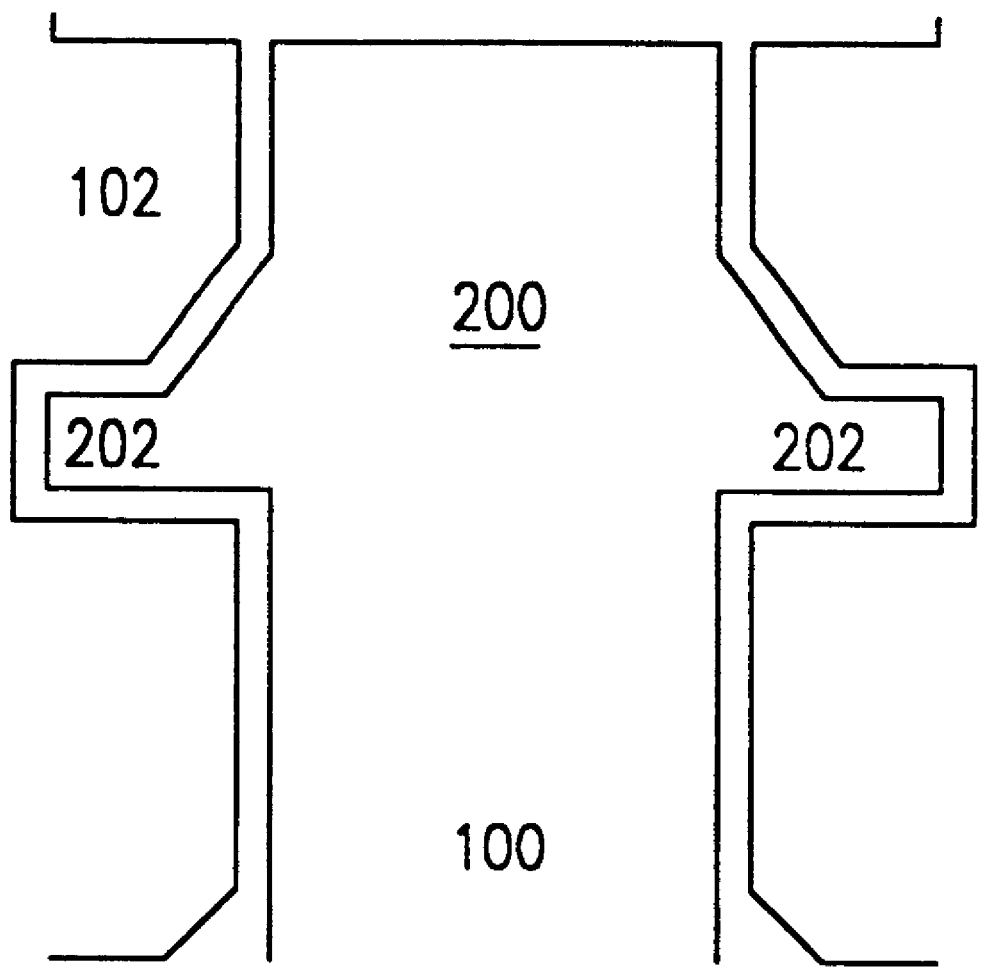
FIG. 5 is a partial schematic of an alternate embodiment to that shown in FIG. 3.

The system works equally well if the shaft and sleeve are inverted as shown in FIG. 5, so that the conical bearing 200 is now above the thrust bearing 202. In this instance, the primary load bearing surfaces become the conical bearing 200 generally indicated at 3. The same considerations apply, however, to the design of the overall system.

Specific note should also be made of some of the relative dimensions of the journal bearings of the system. That is, the width D0 of the upper section 220 of the fixed shaft which defines the upper journal bearing can be greater than the width D1 of the section 222 of the shaft which forms the lower journal bearings. This allows for greater tolerances in the upper gap 224 which defines the upper journal, relative to the width of the gap 226 which forms the lower journal bearings. It should also be noted that the length L0 of the upper journal bearing 7, 8 from thrust bearing 202 to the end of the shaft is less than the length L1 of the lower journal bearing 1, 2 which extends from the end of the conical bearing 200 to the end of the shaft.

A further important feature of the invention is that the design effectively decouples adjacent bearing elements from each other, this minimizing the effects of pressure imbalances and diminishing the likelihood of fluid being forced out of either end of the bearing. Thus lateral bores 114, 115, 116, 117, 118 are provided from a central vent hole 110 to a junction between each of the primary bearing sections 1–8. The central vent 110 preferably runs all the way to one end or the other of the shaft. Further, the walls of the sleeve 102 and shaft 100 diverge slightly on either side of each bearing. The effect as shown in FIG. 3, is to form the meniscus of a capillary seal on either side of each junction between one of the lateral bores and the gap 104, typically at a junction between adjacent bearing sections, preventing bearing fluid flowing from one bearing section to the next, and effectively isolating adjacent bearing sections. This approach reduces the likelihood of fluid loss from either end of the bearing.

FIGS. 4A and 4B are partial sectional views illustrating alternative methods of assembly of the bearing of the present invention. Each of these assembly methods is especially useful in a design incorporating shorter, larger radius journal bearings 7, 8 defined by shaft segment 220 which has a less critical gap width than the longer, narrower journal bearing 1, 2, defined by shaft segment 222. Assume in this example that the top portion has a shorter, wider journal bearing; the sleeve 102 is held in place and the longer journal bearing is inserted therein. In this approach, the sleeve 102 in addition to having a tapered wall 210 to define one side of the gap of the conical bearing, ends in an anally extending wall 400, which ends in a step 410. A complementary notch 412 is provided in a block 414 which will fill the gap between the side wall 416 of sleeve 102 and the outer wall 418 of the upper journal bearing 220. The complementary step 410 and notch 412 will define the position of the block 414 so that the gap 422, 210 is set with reasonable accuracy.

Alternatively, the conical side wall of the sleeve 210 may end in a relatively short vertical wall 440, which then tapers off into an angular wall section 442. The filler block 444, which will fill the space above the thrust bearing 202 and provides the complementary wall for the journal bearing, is then pressed into place, with the filler block having an outer angular wall 446 which made securely against the inner angular wall 442 of the sleeve. By providing these angular complementary walls, the filler block can accurately be seated in place, establishing the width of the gap 422 for the thrust bearing 202, the gap 424 and 210 for the upper journal bearing and conical bearing respectively.

Other features and advantages of the present invention may become apparent to a person of skill in the art who studies the present invention disclosure. It is already established that the present invention efficiently combines many advantages of both a conical bearing and a thrust bearing. The interface of the hydrodynamic bearings with the surrounding sleeve is extended over a greater area than in prior art designs, providing increased bearing stiffness and stability. Furthermore, the rotating system is more stable the closer the mass center of the sleeve lies to the weight bearing surface. For a single plate cantilever bearing the mass center lies far away from the top surface of thrust plate 6 which is usually the bearing surface. In this particular design, the weight bearing surface, which is either the top of conical bearing or the conical surface itself based on the bearing orientation lies close to mass center of the sleeve. This makes the system more stable. The acute angled surface of the conical bearing also facilitates smooth operation, ease of assembly, and reduces the effects of differential thermal distortion Forces on the hydrodynamic bearing will generally cause the cone to rotate within the cooperating portion, especially because the design provides extensions 220, 222 of the shaft defining journal bearings on either side of the thrust bearing and conical bearing combination. It will be apparent that this design is less likely to be damaged than prior art/thrust plate designs in which a small tilt of the drive shaft or surrounding sleeve could cause the tip contact between the thrust plate and the surrounding sleeve, or could cause the thrust plate to travel a relatively long distance.

Figure 6:
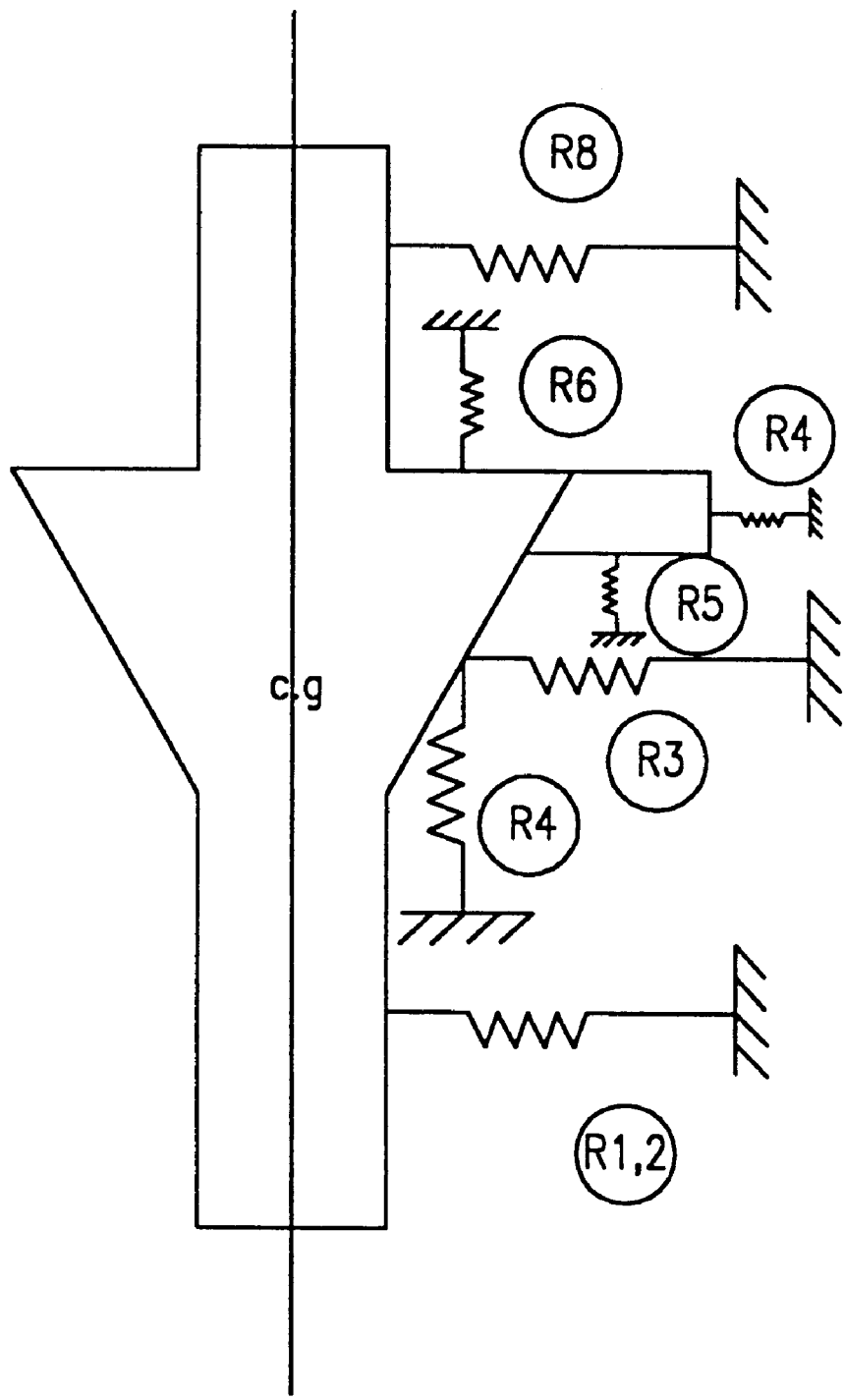
FIG. 6 is a schematic diagram which illustrates some of the advantages of the present design.

Many of these advantages can be better understood by reference to FIG. 6. In that figure, the resistors R1–R9 represent the resistance to movement or stiffness created by the different bearing sections. Radial stiffness and damping are provided by upper journal 7, 8, the conical bearing 3 and lower journal 1, 2. Hence, the design enhances stability. Rocking stiffness increases because journal sections 1, 2 and 7, 8 are far apart. This enhances bearing performance. Depending on where the center of gravity or center of rotation is located, the diameter of upper and lower journals D0, D1 can be adjusted to get maximum rocking stiffness for enhanced bearing performances. Preloading in the thrust plate 4, 6 and conical bearing 3 enhances stability. Gaps in the thrust plate 6 and conical bearing 3 can be easily adjusted/controlled to compensate for journal based tolerances and their reduced performances.

As noted above, the above-described embodiment is a fixed shaft design; however, the design could as easily comprise a rotating shaft/fixed sleeve combination.

Other features and advantages of the present invention would be apparent to a person of skill in the art who studies the invention disclosure. Therefore, the scope of the present invention is to be limited only by the following claims.

What is claimed is:

1. A magnetic disc storage system comprising a housing for said disc drive,
   means for supporting one or more discs for constant speed rotation, and means for accessing data storage locations on each of said discs,
   said means for supporting comprising fluid-filled hydrodynamic bearing means for enabling a hub supporting said one or more discs to rotate relative to a shaft supported in said housing.

2. A disc drive comprising a disc, a motor, and connected to said disc and said motor a means for fluidically coupling said discs and said motor to achieve a constant rotational speed.

3. A system as claimed in claim 1 wherein said bearing means comprises a plurality of separate bearings arrayed along said shaft.

4. A system as claimed in claim 3 including means for decoupling each of said adjacent bearings from one another.

* * * * *